US010563900B2

(12) United States Patent
Ferguson

(10) Patent No.: US 10,563,900 B2
(45) Date of Patent: Feb. 18, 2020

(54) TRANSPORT REFRIGERATION UNIT WITH EVAPORATOR DEFORST HEAT EXCHANGER UTILIZING COMPRESSED HOT AIR

(71) Applicant: CARRIER CORPORATION, Jupiter, FL (US)

(72) Inventor: Benjamin Edward Ferguson, Cazenovia, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 153 days.

(21) Appl. No.: 15/736,342

(22) PCT Filed: Jun. 15, 2016

(86) PCT No.: PCT/US2016/037491
§ 371 (c)(1),
(2) Date: Dec. 14, 2017

(87) PCT Pub. No.: WO2016/205274
PCT Pub. Date: Dec. 22, 2016

(65) Prior Publication Data
US 2018/0202703 A1    Jul. 19, 2018

Related U.S. Application Data

(60) Provisional application No. 62/181,980, filed on Jun. 19, 2015.

(51) Int. Cl.
*F25D 21/12* (2006.01)
*F02B 29/04* (2006.01)
(Continued)

(52) U.S. Cl.
CPC ............ *F25D 21/125* (2013.01); *F02B 29/04* (2013.01); *F02B 29/0493* (2013.01); *F25B 1/00* (2013.01);
(Continued)

(58) Field of Classification Search
CPC .............. F02B 29/0412; F02B 29/0418; F02B 29/0443; F02B 37/00–24; B60H 1/14; Y02T 10/144
See application file for complete search history.

(56) References Cited

U.S. PATENT DOCUMENTS

| 4,646,529 A | 3/1987 | Hanson |
| 4,949,551 A | 8/1990 | Gregory |

(Continued)

FOREIGN PATENT DOCUMENTS

| CN | 102782424 A | 11/2012 | |
| DE | 102004007035 A1 * | 9/2005 | ........... B60H 1/3222 |

(Continued)

OTHER PUBLICATIONS

International Search Report for application No. PCT/US2016/037491 dated Sep. 19, 2016, 6 pages.
(Continued)

*Primary Examiner* — Laert Dounis
(74) *Attorney, Agent, or Firm* — Cantor Colburn LLP

(57) ABSTRACT

A transport refrigeration unit includes a combustion engine system having a turbo-charger constructed and arranged to receive air in a cold state and expel the air in a compressed hot state, an evaporator, and a defrost heat exchanger constructed and arranged to receive the air in the compressed hot state and expel the air in a compressed cooled state for defrosting the evaporator. In operation, the unit may be capable of controlling a defrost temperature and/or controlling the temperature of the air entering a combustion
(Continued)

engine of the engine system for combustion by controlling the volume of air flow between the defrost heat exchanger and a charge air cooler of the engine system.

19 Claims, 3 Drawing Sheets

(51) Int. Cl.
  *F25B 1/00* (2006.01)
  *F25D 11/00* (2006.01)
  *F25D 17/06* (2006.01)
  *F25D 21/00* (2006.01)

(52) U.S. Cl.
  CPC .......... *F25D 11/003* (2013.01); *F25D 17/067* (2013.01); *F25D 21/004* (2013.01)

(56) References Cited

U.S. PATENT DOCUMENTS

| | | | |
|---|---|---|---|
| 5,201,185 A | 4/1993 | Hanson et al. | |
| 6,006,540 A * | 12/1999 | Coletti | F01P 3/20 |
| | | | 123/542 |
| 6,708,510 B2 | 3/2004 | Sulc et al. | |
| 6,807,813 B1 | 10/2004 | Lesage | |
| 6,964,172 B2 | 11/2005 | Dudley et al. | |
| 7,143,594 B2 | 12/2006 | Ludwig et al. | |
| 8,590,330 B2 | 11/2013 | Walker et al. | |
| 2003/0015183 A1 * | 1/2003 | Sealy | F02B 27/02 |
| | | | 123/563 |
| 2006/0042282 A1 * | 3/2006 | Ludwig | F25B 41/04 |
| | | | 62/222 |
| 2008/0092539 A1 | 4/2008 | Marshall et al. | |
| 2010/0107661 A1 | 5/2010 | Awwad et al. | |
| 2011/0000446 A1 * | 1/2011 | Kardos | F01P 7/165 |
| | | | 123/41.02 |
| 2011/0139131 A1 * | 6/2011 | Kardos | F01P 3/12 |
| | | | 123/542 |
| 2013/0086929 A1 | 4/2013 | Senf, Jr. | |
| 2014/0137580 A1 | 5/2014 | Peyaud et al. | |
| 2014/0223933 A1 | 8/2014 | Steele et al. | |
| 2014/0331706 A1 | 11/2014 | Taras et al. | |
| 2015/0007561 A1 * | 1/2015 | Massano | F02B 29/0412 |
| | | | 60/599 |
| 2016/0332504 A1 * | 11/2016 | Blatchley | F25B 47/022 |

FOREIGN PATENT DOCUMENTS

| | | | | |
|---|---|---|---|---|
| DE | 102014220097 A1 * | 4/2016 | ................ | F01P 3/12 |
| JP | S6165015 A | 4/1986 | | |
| JP | S6165016 A | 4/1986 | | |
| WO | 2009153515 A1 | 12/2009 | | |
| WO | WO-2016050463 A1 * | 4/2016 | .......... | F02B 29/0412 |
| WO | WO-2016050475 A1 * | 4/2016 | .......... | F02B 29/0406 |

OTHER PUBLICATIONS

Written Opinion for application No. PCT/US2016/037491 dated Sep. 19, 2016, 5 pages.

* cited by examiner

TRANSPORT REFRIGERATION UNIT WITH EVAPORATOR DEFORST HEAT EXCHANGER UTILIZING COMPRESSED HOT AIR

CROSS-REFERENCES TO RELATED APPLICATIONS

This patent application is a National Stage Application of PCT/US2016/037491, filed Jun. 15, 2016, which claims the priority of U.S. Provisional Application No. 62/181,980, filed Jun. 19, 2015, each of which are incorporated herein by reference in their entirety.

BACKGROUND

The present disclosure relates to transport refrigeration units and, more particularly, to evaporator defrosting and associated control logic.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link In other systems, the engine drives a generator that generates electrical power, which in-turn drives the compressor.

Evaporators of the refrigeration units are used during the refrigeration process to maintain appropriate temperatures within the cargo compartment. During the cooling cycle, humidity in the air within the cargo compartment may collect on the evaporator in the form of ice. Continued buildup of ice reduces the evaporator efficiency, thus a defrost cycle may be initiated by the unit to remove the ice. Manufacturers and operators of fleets of refrigerated trucks, trailers and/or cargo containers desire to maximize operational efficiency of the entire operation cycle(s) of the refrigeration system. One area of improvement may be made with respect to the defrosting capability of the refrigeration system.

SUMMARY

A transport refrigeration unit according to one, non-limiting, embodiment of the present disclosure includes a combustion engine system including a turbo-charger constructed and arranged to receive air in a cold state and expel the air in a compressed hot state; an evaporator; and a defrost heat exchanger constructed and arranged to receive the air in the compressed hot state and expel the air in a compressed cooled state for defrosting the evaporator.

Additionally to the foregoing embodiment, the combustion engine system includes a charge air cooler constructed and arranged to receive at least a portion of the air in a compressed hot state and expel the air in the compressed cooled state.

In the alternative or additionally thereto, in the foregoing embodiment, the combustion engine system includes an internal combustion engine constructed and arranged to receive the air in the compressed cooled state for combustion.

In the alternative or additionally thereto, in the foregoing embodiment, the unit includes a diverter valve constructed and arranged to receive the air in the compressed hot state from the turbo-charger and controllably flow the air in the compressed hot state between the charge air cooler and the defrost heat exchanger.

In the alternative or additionally thereto, in the foregoing embodiment, the combustion engine system includes an internal combustion engine constructed and arranged to receive the air in the compressed cooled state for combustion.

In the alternative or additionally thereto, in the foregoing embodiment, the internal combustion engine is a diesel engine.

In the alternative or additionally thereto, in the foregoing embodiment the unit includes a first temperature sensor configured to monitor temperature of the air in the compressed cooled state entering the defrost heat exchanger; and an electric controller configured to control the diverter valve at least in-part based on a first temperature signal received from the first temperature sensor.

In the alternative or additionally thereto, in the foregoing embodiment the unit includes a second temperature sensor configured to monitor temperature of the air in the compressed cooled state at an intake manifold of the internal combustion engine, and wherein the electric controller is configured to in-part control the diverter valve based on a second temperature signal received from the second temperature sensor.

In the alternative or additionally thereto, in the foregoing embodiment the unit includes a pressure sensor configured to monitor pressure of the air in the compressed cooled state, and wherein the electric controller is configured to in-part control the diverter valve based on a pressure signal received from the pressure sensor.

In the alternative or additionally thereto, in the foregoing embodiment the unit includes an evaporator fan constructed and arranged to flow air through the defrost heat exchanger and the evaporator.

In the alternative or additionally thereto, in the foregoing embodiment, the evaporator, the defrost heat exchanger and the evaporator fan are in a cargo compartment.

In the alternative or additionally thereto, in the foregoing embodiment, the defrost heat exchanger is adjacent to the evaporator.

In the alternative or additionally thereto, in the foregoing embodiment, all of the air in the compressed hot state flows through the charge air cooler during a normal cooling cycle.

A method of operating a transport refrigeration unit according to another, non-limiting, embodiment includes flowing air through a turbo-charger of a combustion engine; expelling the air from the turbo-charger in a compressed hot state; flowing the air in the compressed hot state through a charge air cooler; initializing a defrost cycle; and diverting at least a portion of the air in the compressed hot state through a defrost heat exchanger.

Additionally to the foregoing embodiment the method includes expelling at least the portion of the air from the defrost heat exchanger in substantially a compressed cooled state; and flowing the air in the compressed cooled state into an air intake manifold of the combustion engine.

In the alternative or additionally thereto, in the foregoing embodiment the method includes flowing compartment air via a fan through the defrost heat exchanger and through an evaporator.

In the alternative or additionally thereto, in the foregoing embodiment the method includes re-positioning a diverter valve by an electric controller to flow at least the portion of the air in the compressed hot state through the defrost heat exchanger upon initialization of the defrost cycle.

In the alternative or additionally thereto, in the foregoing embodiment the method includes controlling defrost temperature by adjusting air flow between the defrost heat exchanger and the charge air cooler.

In the alternative or additionally thereto, in the foregoing embodiment the method includes controlling temperature of the air entering an air intake manifold of the combustion engine by adjusting air flow between the defrost heat exchanger and the charge air cooler.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
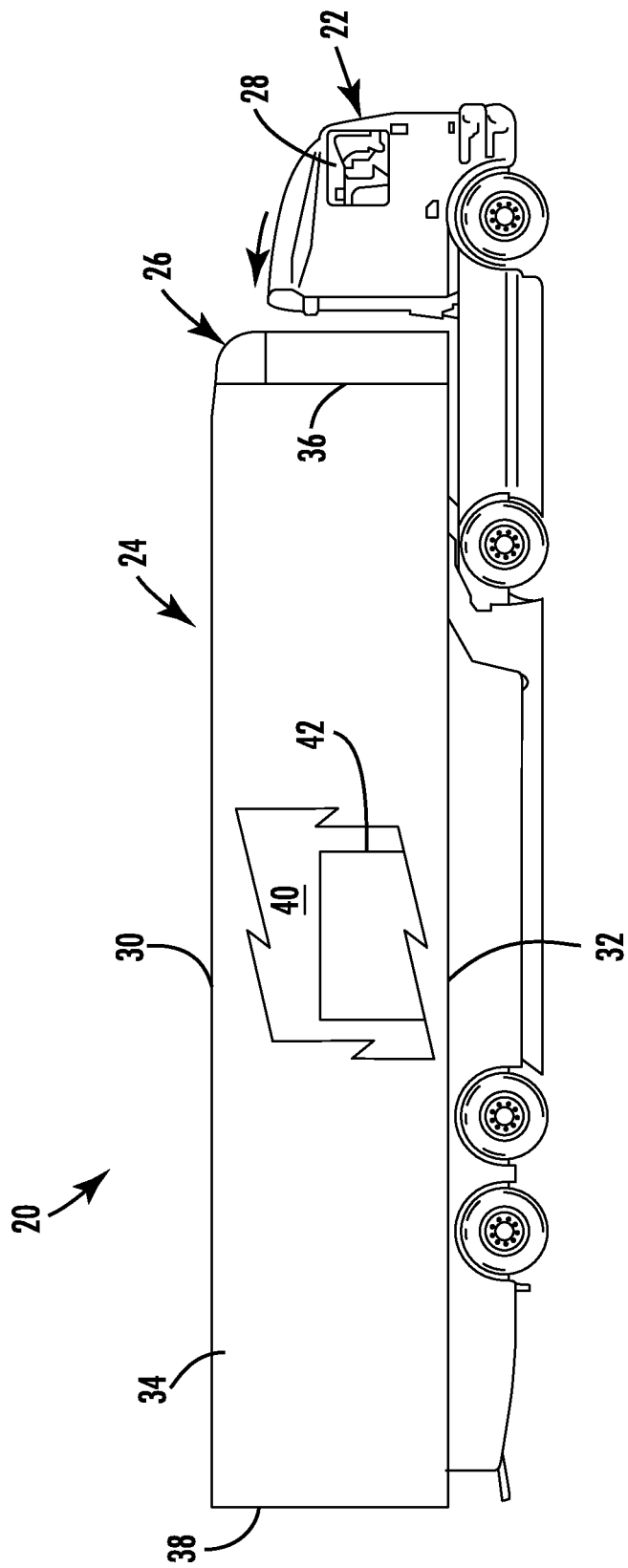
FIG. 1 is a side view of a tractor trailer system having a transport refrigeration unit as one, non-limiting, exemplary embodiment of the present disclosure.

Referring to FIG. 1, one, non-limiting, embodiment of a tractor trailer system 20 of the present disclosure is illustrated. The tractor trailer system 20 may include a tractor 22, a trailer 24 and a transport refrigeration unit 26. The tractor 22 may include an operator's compartment or cab 28 and an engine (not shown) which is part of the powertrain or drive system of the tractor 22. The trailer 24 may be coupled to the tractor 22 and is thus pulled or propelled to desired destinations. The trailer may include a top wall 30, a bottom wall 32 opposed to and space from the top wall 30, two side walls 34 spaced from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38 together define the boundaries of a cargo compartment 40.

Figure 2:
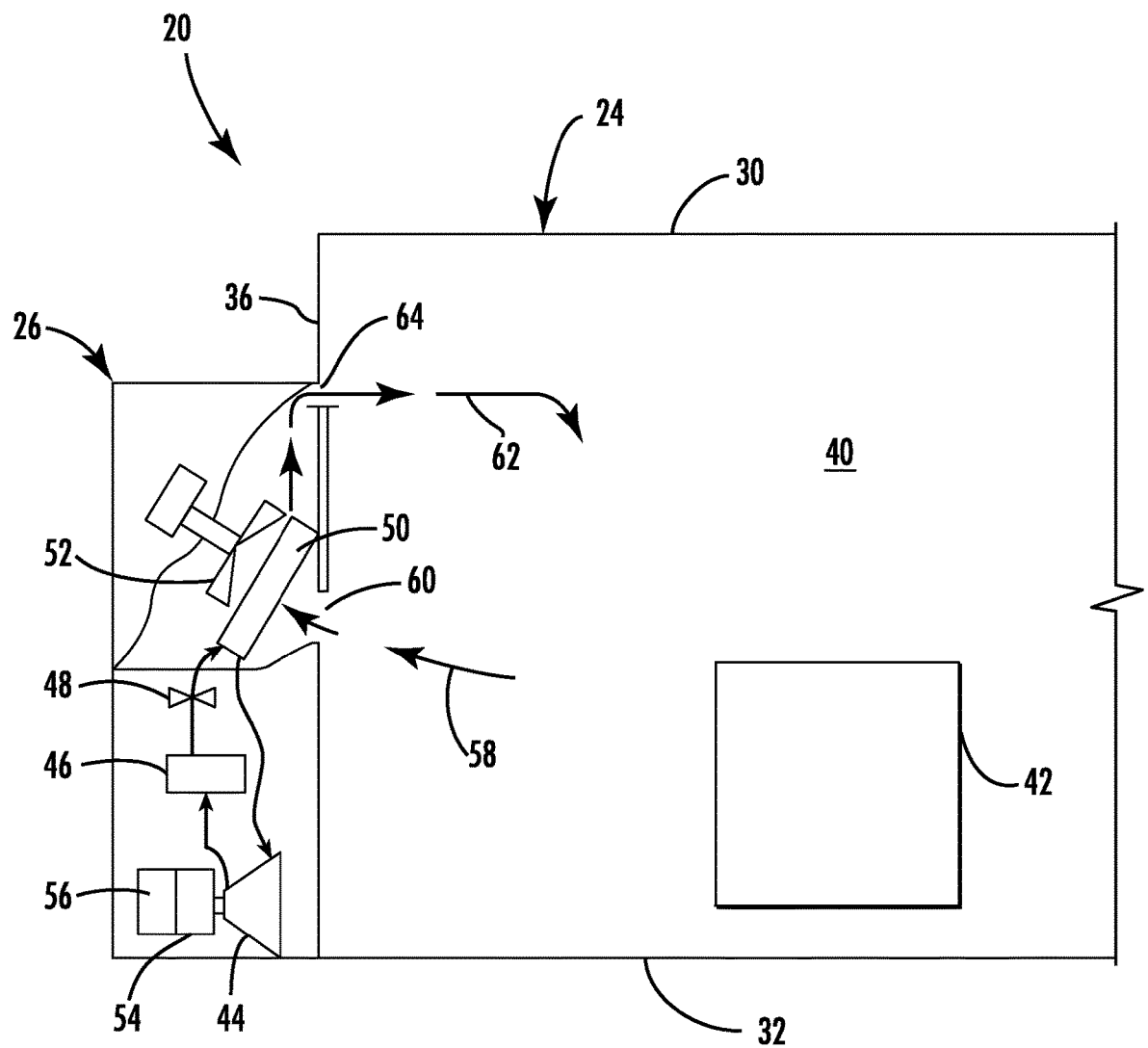
FIG. 2 is a schematic of the transport refrigeration unit.

Referring to FIGS. 1 and 2, the trailer 24 is generally constructed to store a cargo 42 in the compartment 40. The refrigeration unit 26 is generally integrated into the trailer 24 and may be near the front wall 36. The cargo 42 is maintained at a desired temperature by cooling of the compartment 40 via the refrigeration unit 26 that circulates airflow into and through the cargo compartment 40 of the trailer 24.

The refrigeration unit 26 may include a compressor 44, a condenser 46, an expansion valve 48, an evaporator 50, and an evaporator fan 52. The compressor 44 may be powered by an electrical generator 54 driven by an engine system 56.

During a normal cooling cycle of the refrigeration unit 26, a return airflow 58 flows into the refrigeration unit 26 from the cargo compartment 40 of the trailer 24 through a refrigeration unit inlet 60, and across the evaporator 50 via the evaporator fan 52, thus cooling the return airflow 58. Once cooled, the return airflow 58 becomes supply airflow 62 and is supplied to the cargo compartment 40 through an outlet 64 of the unit 26. The outlet 64 may be located near the top wall 30 and is generally spaced above the inlet 60.

Figure 3:
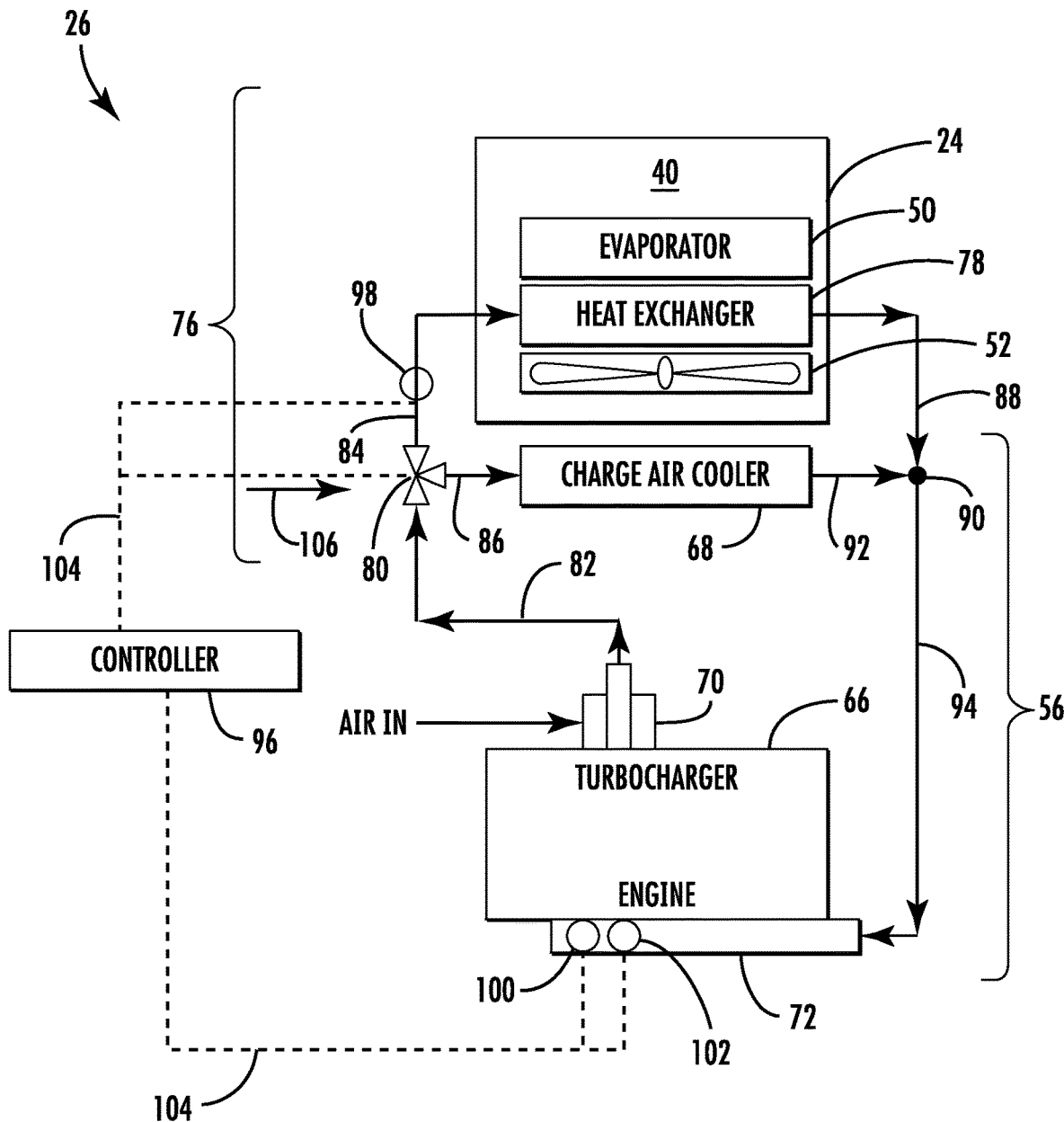
FIG. 3 is another schematic of the transport refrigeration unit.

Referring to FIG. 3, the engine system 56 may include an internal combustion engine 66 and a charge air cooler 68. The engine 66 includes a turbo-charger 70 constructed to receive ambient air and expel the air in a heated compressed state, and an air intake manifold 72 constructed to generally receive the air in a cooled compressed state for combustion in the engine. During the normal cooling cycle of the refrigeration unit 26, the air in the heated compressed state flows through the charge air cooler 68 where it is expelled in the cooled compressed state and enters the intake manifold 72. The cooler temperature and the pressure of the air may be pre-determined and is generally dictated by combustion requirements, and output power and/or emission demands of the engine 66.

The refrigeration unit 26 includes a defrost system 76 capable of diverting at least a portion of the air in the heated compressed state for defrosting the evaporator 50 upon demand. The defrost system 76 may include a defrost heat exchanger 78 generally positioned between the evaporator fan 52 and the evaporator 50, and a diverter valve 80 that may be electrically controlled for diverting the air in the heated compressed state between the defrost heat exchanger 78 and the charge air cooler 68. It is further contemplated and understood that coolant tubes (not shown) of the defrost heat exchanger 78 may be interlaced in the evaporator 50.

The refrigeration unit 26 may generally include a first duct 82 that extends and communicates between an outlet of the turbocharger 70 and an inlet of the diverter valve 80, a second duct 84 that extends and communicates between a first outlet of the diverter valve 80 and an inlet of the defrost heat exchanger 78, and a third duct 86 that extends and communicates between a second outlet of the diverter valve 80 and an inlet of the charge air cooler 68. A fourth duct 88 of the unit 26 may extend and communicate between an outlet of the defrost heat exchanger 78 and a first inlet of a junction 90. A fifth duct 92 of the unit 26 may extend and communicate between an outlet of the charge air cooler 68 and a second inlet of the junction 90. And, a sixth duct 94 of the unit 26 may extend and communicate between an outlet of the junction 90 and an inlet of the air intake manifold 72. It is further contemplated and understood that other arrangements of ducts and components are plausible. For example, the diverter valve 80 and the junction 90 may be interchanged. As another example, the junction 90 may generally be the air intake manifold 72 and the sixth duct 94 may not be necessary.

The defrost system 76 may further include an electric controller 96 (that may include a processor and a computer readable storage medium, not shown), a first temperature sensor 98 generally located in the second duct 84, a second temperature sensor 100 generally located in or proximate to the intake manifold 72 and a pressure sensor 102 generally located in or proximate to the intake manifold 72. The sensors 98, 100, 102 and diverter valve 80 are in communication with the controller 96 over wired or wireless paths 104. In operation and with the engine system 56 running, the transport refrigeration unit 26 may initiate or call for a defrost cycle to initiate (i.e., end of a normal cooling cycle). Upon initiation, the controller 96 may send a command signal (see arrow 106) to the diverter valve 80 causing the valve to re-position and divert the flow of air in the compressed heated state, thereby substantially ceasing flow through the charge air cooler 68 and, instead, flowing the heated air through the defrost heat exchanger 78. What would otherwise be waste heat, the defrost heat exchanger 78 extracts the heat from the air and utilizes the heat to defrost the evaporator 50. The air may exit the defrost heat exchanger 78 in a compressed cooled state where the air may flow through the ducts 88, 94 and into the air intake manifold 72 for combustion.

The temperature of the air in the compressed heated state flowing through the second duct 84 may be monitored by the controller 96 via the temperature sensor 98. Similarly, the temperature and pressure of the compressed cooled air flowing through the ducts 88, 92, 94 may be monitored by the controller 96 via the respective temperature and pressure sensors 100, 102. The temperature sensor 98 may facilitate fine tuning of the defrost temperatures by providing the controller 96 with the necessary data to adjust the diverter valve 80 (i.e., adjusting flow portions between the heat exchanger 78 and cooler 68). The temperature and pressure sensors 100, 102 similarly provide the controller 96 with necessary data via paths 104 to assure that the air in the compressed cooled state is, for example, cool enough to stay within the engine manufacturer's guidelines. If, for example, the air in the intake manifold 72 is too warm, the controller 96 may re-position the diverter valve 80 to decrease the flow through the defrost heat exchanger 78 and increase flow through the charge air cooler 68.

The defrost system 76 when compared to more traditional systems, provides a unified method of defrosting the evaporator coil between different styles of transport refrigeration units. Moreover, the system may eliminate the need to divert refrigeration gas which saves on copper tubing and reduces brazing requirements during manufacture, and/or saves on the use of electric rods and wiring known to be used in more traditional electric defrost systems.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A transport refrigeration unit comprising:
   a combustion engine system including a turbo-charger constructed and arranged to receive air in a cold state and expel the air in a compressed hot state;
   an evaporator; and
   a defrost heat exchanger constructed and arranged to receive the air in the compressed hot state for defrosting the evaporator, and expel the air in a compressed cooled state.

2. The transport refrigeration unit set forth in claim 1, wherein the combustion engine system includes a charge air cooler constructed and arranged to receive at least a portion of the air in the compressed hot state and expel the air in the compressed cooled state.

3. The transport refrigeration unit set forth in claim 2, wherein the combustion engine system includes an internal combustion engine constructed and arranged to receive the air in the compressed cooled state for combustion.

4. The transport refrigeration unit set forth in claim 2 further comprising:
   a diverter valve constructed and arranged to receive the air in the compressed hot state from the turbo-charger and controllably flow the air in the compressed hot state between the charge air cooler and the defrost heat exchanger.

5. The transport refrigeration unit set forth in claim 4, wherein the combustion engine system includes an internal combustion engine constructed and arranged to receive the air in the compressed cooled state for combustion.

6. The transport refrigeration unit set forth in claim 5, wherein the internal combustion engine is a diesel engine.

7. The transport refrigeration unit set forth in claim 5 further comprising:
   a first temperature sensor configured to monitor temperature of the air in the compressed hot state entering the defrost heat exchanger; and
   an electric controller configured to control the diverter valve at least in-part based on a first temperature signal received from the first temperature sensor.

8. The transport refrigeration unit set forth in claim 7 further comprising:
   a second temperature sensor configured to monitor temperature of the air in the compressed cooled state at an intake manifold of the internal combustion engine, and wherein the electric controller is configured to in-part control the diverter valve based on a second temperature signal received from the second temperature sensor.

9. The transport refrigeration unit set forth in claim 8 further comprising:
   a pressure sensor configured to monitor pressure of the air in the compressed cooled state, and wherein the electric controller is configured to in-part control the diverter valve based on a pressure signal received from the pressure sensor.

10. The transport refrigeration unit set forth in claim 1 further comprising:
    an evaporator fan constructed and arranged to flow air through the defrost heat exchanger and the evaporator.

11. The transport refrigeration unit set forth in claim 10, wherein the evaporator, the defrost heat exchanger and the evaporator fan are in a cargo compartment.

12. The transport refrigeration unit set forth in claim 11, wherein the defrost heat exchanger is adjacent to the evaporator.

13. The transport refrigeration unit set forth in claim 4, wherein all of the air in the compressed hot state flows through the charge air cooler during a normal cooling cycle.

14. A method of operating a transport refrigeration unit comprising:
    flowing air through a turbo-charger of a combustion engine;
    expelling the air from the turbo-charger in a compressed hot state;
    flowing the air in the compressed hot state through a charge air cooler;
    initializing a defrost cycle; and diverting at least a portion of the air in the compressed hot state through a defrost heat exchanger.

15. The method set forth in claim 14 further comprising:

expelling at least the portion of the air from the defrost heat exchanger in substantially a compressed cooled state; and flowing the air in the compressed cooled state into an air intake manifold of the combustion engine.

16. The method set forth in claim 15 further comprising:

flowing compartment air via a fan through the defrost heat exchanger and through an evaporator.

17. The method set forth in claim 14 further comprising:

re-positioning a diverter valve by an electric controller to flow at least the portion of the air in the compressed hot state through the defrost heat exchanger upon initialization of the defrost cycle.

18. The method set forth in claim 17 further comprising:

controlling defrost temperature by adjusting air flow between the defrost heat exchanger and the charge air cooler.

19. The method set forth in claim 17 further comprising:

controlling temperature of the air entering an air intake manifold of the combustion engine by adjusting air flow between the defrost heat exchanger and the charge air cooler.

\* \* \* \* \*

UNITED STATES PATENT AND TRADEMARK OFFICE
CERTIFICATE OF CORRECTION

PATENT NO. : 10,563,900 B2  
APPLICATION NO. : 15/736342  
DATED : February 18, 2020  
INVENTOR(S) : Benjamin Edward Ferguson Page 1 of 1

It is certified that error appears in the above-identified patent and that said Letters Patent is hereby corrected as shown below:

On the Title Page

Item (54) and in the Specification, Column 1, Line 2 Please replace "DEFORST" with "DEFROST"

Signed and Sealed this
Second Day of June, 2020

Andrei Iancu
*Director of the United States Patent and Trademark Office*